US008320281B2

(12) United States Patent
Phillips et al.

(10) Patent No.: US 8,320,281 B2
(45) Date of Patent: Nov. 27, 2012

(54) METHODS, SYSTEMS AND COMPUTER READABLE MEDIA FOR UTILIZING A STANDARD SPANNING TREE PROTOCOL TO INDICATE AN ACTIVE SWITCHING FABRIC IN A NETWORK NODE

(75) Inventors: Paul Phillips, Westborough, MA (US); Jason Christopher Terry, Ayer, MA (US)

(73) Assignee: Genband US LLC, Plano, TX (US)

( * ) Notice: Subject to any disclaimer, the term of this patent is extended or adjusted under 35 U.S.C. 154(b) by 239 days.

(21) Appl. No.: 12/720,647

(22) Filed: Mar. 9, 2010

(65) Prior Publication Data
US 2011/0222440 A1 Sep. 15, 2011

(51) Int. Cl.
*H04L 12/28* (2006.01)
(52) U.S. Cl. ........................ 370/256; 709/239
(58) Field of Classification Search .................. 370/256; 709/239
See application file for complete search history.

(56) References Cited

U.S. PATENT DOCUMENTS

| 6,535,490 | B1* | 3/2003 | Jain ............................... 370/256 |
| 7,639,605 | B2* | 12/2009 | Narayanan et al. ........... 370/219 |
| 8,077,709 | B2* | 12/2011 | Cai et al. ....................... 370/389 |

OTHER PUBLICATIONS

IEEE Computer Society, "IEEE Standard for Local and metropolitan area networks; Media Access Control (MAC) Bridges," IEEE Std 802.1D (Jun. 9, 2004).

* cited by examiner

*Primary Examiner* — Robert Wilson
*Assistant Examiner* — Wei Zhao
(74) *Attorney, Agent, or Firm* — Jenkins, Wilson, Taylor & Hunt, P.A.

(57) ABSTRACT

Methods, systems, and computer readable media for utilizing a standard spanning tree protocol to designate an active switching device in a network node are disclosed. In one example, the method includes generating a virtual network topology representation that includes a payload processing device connected to each of a first switching device and a second switching device, transmitting, from each of the first and second switching devices to the payload processing device, a standard spanning tree protocol signaling message that contains the virtual network topology representation and a bridge root priority identifier that has been derived using an algorithm that considers whether the transmitting switching device is a preferred active switching device or a preferred standby switching device, and signaling messages at the payload processing device to select the preferred active switching device as a root bridge of a logical spanning tree based on comparing bridge root priority identifiers.

26 Claims, 4 Drawing Sheets

METHODS, SYSTEMS AND COMPUTER READABLE MEDIA FOR UTILIZING A STANDARD SPANNING TREE PROTOCOL TO INDICATE AN ACTIVE SWITCHING FABRIC IN A NETWORK NODE

TECHNICAL FIELD

The subject matter described herein relates to selecting switching fabrics utilized by payload blades in a telecommunications network element. More particularly, the subject matter described herein relates to methods, systems, and computer readable media for utilizing a standard spanning tree protocol to indicate an active switching fabric in a network node.

BACKGROUND

Currently, some telecommunication network elements or nodes are embodied in a chassis form factor that includes a plurality of slots for receiving payload blades, and two or more slots for receiving redundant switch blades. The payload blades are responsible for providing the processing and computing duties of the network node, while the switch blades are responsible for providing the switching fabric that the payload blades use for internal communications. The switch blades also serve as an interface for the communications between the network node and external networks. All the blade devices in the network node can communicate with each other via the central backplane fabric.

In most telecommunication networks, standard bridging and routing protocols are used to manage redundant network connectivity of the network node. Specifically, these standard protocols are used to designate an active and redundant switch fabric, and signal these fabric designations to the payload blades in the network node. However, most standard protocols only provide a generic solution that is designed or intended to accommodate a wide range of different network topologies. Thus, there are many instances where using a standard protocol may prove to be an excessive solution for a fixed and constrained topology of a particular network. In particular, standard protocols may be slow to converge following a change in the network topology, since they are intended to discern a variety of network failures, many of which cannot occur in the constrained topology. Furthermore, a standard protocol may create disruptions by causing the network node to interact with the customer's external network in unexpected and unpredictable ways (as opposed to using a customized protocol). As a result, the network node may employ a customized solution where the switch blades utilize proprietary internal protocols to inform the payload blades of the state of the switching fabric. For example, this may be accomplished using a side-band channel to inform the payload blades that a first switch blade in the network node is designated as an active switch blade and a second switch blade in the network node is designated as a standby switch blade. This approach requires that each payload blade be configured with specific awareness by implementing a pre-defined proprietary protocol, and, as such, may prove costly and time consuming to develop.

Accordingly, there exists a need for methods, systems, and computer readable media for utilizing a hybrid approach where the switching fabric uses proprietary means to designate active and standby switching fabrics in a network node, yet convey this information to payload blades using a standard spanning tree protocol.

SUMMARY

Methods, systems, and computer readable media for utilizing a standard spanning tree protocol to designate an active switching device in a network node are disclosed. In one embodiment, the method includes generating a virtual network topology representation that includes a payload processing device connected to each of a first switching device and a second switching device, which share a virtual link that indicates that the first and second switching devices provide the same network access in the virtual network topology representation. The method also includes transmitting, from each of the first and second switching devices to the payload processing device, a standard spanning tree protocol signaling message that contains the virtual network topology representation and a bridge root priority identifier, wherein the bridge root priority identifier has been derived using an algorithm that considers whether the transmitting switching device is a preferred active switching device or a preferred standby switching device. The method further includes receiving the transmitted spanning tree protocol signaling messages and utilizing a standard spanning tree protocol at the payload processing device to construct a logical spanning tree using the virtual network topology representation and to select the preferred active switching device as a root bridge of the logical spanning tree based on comparing the bridge root priority identifiers as required by the standard spanning tree protocol, wherein the payload processing device only communicates application data via a link to the switching device designated as the root bridge.

The subject matter described herein for utilizing a standard spanning tree protocol to designate an active switching fabric in a network node may be implemented using a computer readable medium having stored thereon computer executable instructions that when executed by the processor of a computer perform steps of the aforementioned method (see above). Exemplary computer readable media suitable for implementing the subject matter described herein includes disk memory devices, programmable logic devices, application specific integrated circuits, and other non-transitory computer readable storage media. In one implementation, the computer readable medium may include a memory accessible by a processor. The memory may include instructions executable by the processor for implementing any of the methods for utilizing a standard spanning tree protocol to designate an active switching fabric in a network node described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
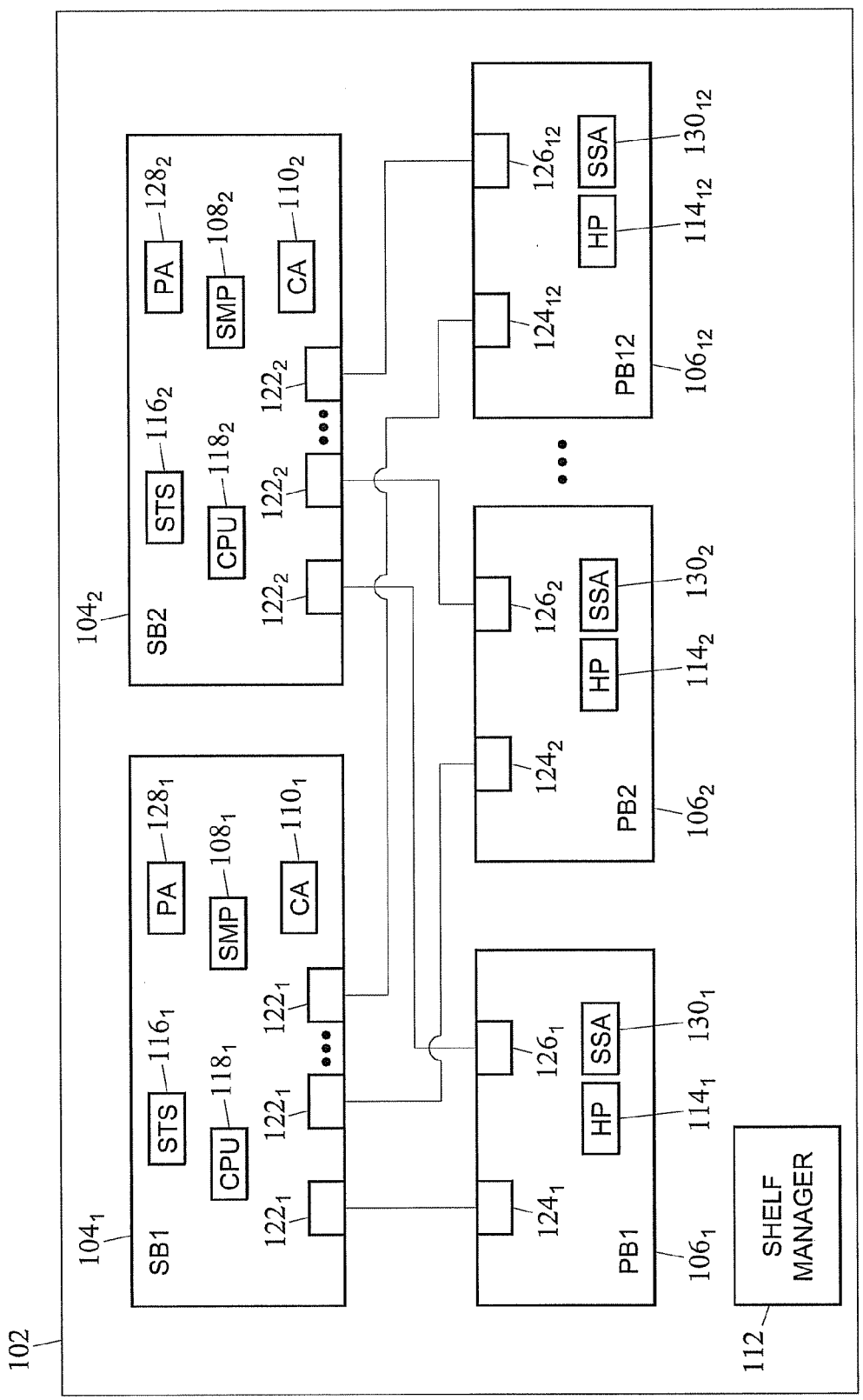
FIG. 1 is a block diagram of an exemplary network element for utilizing a spanning tree protocol to indicate an active switching fabric in a network node according to an embodiment of the subject matter described herein.

FIG. 1 is a block diagram of an exemplary network node 102 that utilizes a standard spanning tree protocol (STP) to indicate an active switching fabric to payload processing devices contained with network node 102 according to an embodiment of the subject matter described herein. In one embodiment, network node 102 comprises a chassis form factor (e.g., an Advanced Telecommunications Computing Architecture (ATCA) chassis or the like) that includes a plurality of slots in a central backplane for accommodating a number of blade device units. For example, network node 102 may be provisioned with switch blades $104_{1-2}$ and a plurality of payload blades $106_{1-12}$. Switch blades $104_{1-2}$ may each be designated to perform either an active switching fabric role or a standby switching fabric role that is utilized by each of payload blades $106_{1-12}$. Specifically, the active switch blade provides the switching fabric used by payload blades $106_{1-12}$ for communicating with external networks (not shown), while the standby switch blade is retained as a backup switching fabric in the event a switch fabric failover or switchover scenario occurs. Payload blades $106_{1-12}$ may be configured to provide the computing and processing capabilities required by network node 102. Although only two switch blades and twelve payload blades are depicted in FIG. 1, any number of blade devices may be used without departing from the scope of the present subject matter. Furthermore, the present subject matter is not limited to switch blades and payload blades, but may involve any type of switching device or payload processing device. Network node 102 may also include a shelf manager 112 that coordinates the management of switch blades $104_{1-2}$ and payload blades $106_{1-12}$. In one embodiment, network node 102 comprises a session border controller (SBC), a security gateway, a media gateway, a gateway controller, a call server, or any other telecommunications network node that utilizes blade devices.

As shown in FIG. 1, each of switch blade $104_1$ and switch blade $104_2$ may include a central processing unit (CPU) 118, a control application 110, a switch monitor process (SMP) 108, a spanning tree stack (STS) 116, and ports 122. Switch blades $104_{1-2}$ may be configured to use a proprietary protocol (e.g., a middleware-based protocol) to communicate with each other. For example, switch blade $104_1$ and switch blade $104_2$ may communicate over a control channel of some type, such as a physical or wireless Ethernet link (not shown).

Central processing unit 118 may comprise any processing device that is configured to execute software applications and processes, such as control application 110, SMP 108, and STS 116. In one example, switch blade $104_1$ may use CPU $118_1$ to execute SMP $108_1$, which monitors and obtains data regarding the general health, and the internal and external network connectivity, of switch blade $104_1$. As used therein, the health and connectivity of a switch blade refers to the general operability and functionality of that switch blade. In one embodiment, health and connectivity may be objectively defined by the number of ports and links that are operable in a switch blade. For example, the health and connectivity data for switch blade $104_1$ may include information such as the number of all healthy internal links for switch blade $104_1$, the number of all healthy external link aggregation (LAG) and non-LAG ports for switch blade $104_1$, and the number of all healthy external ports (e.g., ignoring LAG membership) for switch blade $104_1$. In one embodiment, the health and connectivity data of a switch blade may also take into account the faulty or otherwise unavailable resources of any payload blade connected to that switch blade. For example, if a payload blade has an inoperable port linked to a particular switch blade, the health and connectivity data associated with the switch blade may reflect this failed resource. After obtaining health and connectivity data, SMP $108_1$ may also be configured to supply (or provide access to) this information to controller application $110_1$. In addition, SMP $108_1$ may be further configured to supply the health and connectivity data associated with switch blade $104_1$ to controller application $110_2$ in switch blade $104_2$.

Controller application 110 may comprise a highly-available (HA) application that, when executed by CPU 118, is able to determine the preferred active and preferred standby switching fabric for payload blades $106_{1-12}$. For example, controller application $110_1$ may use the health and connectivity data obtained by SMP $108_1$ and SMP $108_2$ to execute a priority adjustment algorithm $128_1$ to determine which of switch blade $104_1$ and switch blade $104_2$ should be designated the preferred active switch blade and which should be designated the preferred standby switch blade. In one embodiment, priority adjustment algorithm 128 includes any algorithm that considers (i.e., utilizes) health and connectivity data to objectively determine which switch blade is better suited (e.g., which switch blade has the "greatest health and connectivity") to perform the interfacing duties between a payload blade and the connected external networks connected to network node 102. In one embodiment, an exemplary priority adjustment algorithm, where $I_x$=sum of all healthy Internal links for switch-blade$_x$, $N_x$=sum of all healthy external LAGs+healthy external non-LAG ports, $P_x$=sum of all healthy external ports (ignoring LAG membership), Priority$_x$ is the adjusted priority of switch-blade$_x$, and the root priority for all payload blades is 0xFFFFFF00 (i.e., a very low priority), may include the following arithmetic logic:

---

If there is only one healthy switch blade in the chassis:
    that switch-blade's priority is set to ACTIVE;
Else if $I_1 > I_2$:
    Priority$_1$ is set to ACTIVE; Priority$_2$ is set to STANDBY;
Else if $I_2 > I_1$:
    Priority$_1$ is set to STANDBY; Priority$_2$ is set to ACTIVE;
Else if $N_1 > N_2$:
    Priority$_1$ is set to ACTIVE; Priority$_2$ is set to STANDBY;
Else if $N_2 > N_1$:
    Priority$_1$ is set to STANDBY; Priority$_2$ is set to ACTIVE;
Else if $P_1 > P_2$:
    Priority$_1$ is set to ACTIVE; Priority$_2$ is set to STANDBY;
Else if $P_2 > P_1$:
    Priority$_1$ is set to STANDBY; Priority$_2$ is set to ACTIVE;
Else if "Failback to preferred switch-blade" is enabled:
    Priority of preferred switch-blade is set to ACTIVE;
    Priority of non-preferred switch-blade is set to STANDBY;
Else if no switch blade is currently active:
    Priority$_1$ is set to ACTIVE; Priority$_2$ is set to STANDBY;
Else:
    No adjustments to priorities are made;

---

In one embodiment, controller application 110 may execute priority adjustment algorithm 128 on a periodic basis, as well as when a link status event (e.g., a link is activated or fails) or other relevant event (e.g., insertion or removal of a switch blade or payload blade into network node 102) occurs in network node 102. As previously mentioned, controller application 110 may use priority adjustment algorithm 128 to process health and connectivity data to determine a preferred active switch blade (e.g., the switch blade possessing the greatest health and connectivity) and a preferred standby switch blade.

Controller application $110_1$ may also be used to run STS $116_1$ to generate, receive, and modify signaling messages. In one embodiment, these signaling messages may include standard spanning tree signaling messages, such as bridge protocol data unit messages. Bridge protocol data units (BPDUs) may be configuration messages used by switch blades $104_{1-2}$ to communicate with payload blades $106_{1-12}$. In one embodiment, BPDU messages are sent out from a switch blade device to the payload blades as multicast messages via links coupled to switch blade ports $122_1$ and $122_2$. Ports $122_1$ may include any type of physical interface that permits the ingress and egress of signaling and application data to and from switch blade $104_1$, while ports $122_2$ provide the same functionality for switch blade $104_2$.

As previously indicated, payload blades $106_{1-12}$ are configured to provide the computing and processing capabilities required by network node 102. In one embodiment, each of payload blades $106_{1-2}$ runs a standard spanning tree protocol, such as RSTP. In one embodiment, payload blades $106_{1-12}$ may be deployed as high availability (HA) pairs. Each payload blade 106 may include a CPU 114 that runs a standard software application (SSA) 130 (which is generic and non-proprietary) that is configured to receive standard STP messages (e.g., BPDU messages) that include bridge root priority identifiers from switch blade $104_1$ via ports 124 and switch blade $104_2$ via ports 126. For example, STS $116_1$ in active switch blade $104_1$ may send a BPDU message to payload blades $106_{1-12}$ containing a virtual network topology representation and a bridge root priority identifier. The payload blades $106_{1-12}$ may then use a standard SSA 130 to process the virtual network topology representation and the bridge root priority identifiers to create a logical spanning tree to avoid network routing problems, such as loops and flooding. The virtual network topology representation in FIG. 2 is a representation of an Ethernet network topology that includes switch blades $104_{1-2}$ and payload blades $106_1$ and $106_2$.

One example of a standard spanning tree protocol is Rapid Spanning Tree Protocol (RSTP). Although the following description references RSTP as an exemplary embodiment, any other bridging protocol may be used by the network node without departing from the scope of the present subject matter. Rapid Spanning Tree Protocol is a link management protocol that provides path redundancy while preventing undesirable loops in a network. For an Ethernet network (which may be utilized by the switch blades and payload blades in network node 102) to function properly, only one active path may exist between two stations (e.g., two blade devices in network node 102). The presence of multiple active paths between stations may cause loops in the network, which in turn creates the potential for message duplication. This flooding condition CaO confuse and overwhelm the blade devices in a network node and allows duplicate frames to be forwarded. For example, packet traffic may flood the network node because the switch blade does not know where the addressed node is located. The traffic is then sent to all the other blade devices via all the ports of the sending switch blade. The flooded traffic is rebroadcasted continuously, and thus consumes valuable bandwidth.

To eliminate loops and avoid flooding in network node 102, each payload blade uses a standard spanning tree protocol to create a spanning tree to logically connect the switch blades to the payload blade. In one embodiment, host processor $114_1$ on payload blade $106_1$ executes $SSA 130_1$ to create a logical network topology, i.e. a logical spanning tree, using bridge root priority identifier data. In order to create the logical spanning tree, host processor $114_1$ selects preferred active switch blade $104_1$ as a root bridge for the logical spanning tree. Notably, the switch blade that advertises the highest-priority bridge root priority identifier via a BDPU message will be designated as the root bridge. In one embodiment, payload blade $106_1$ receives at least one standard spanning tree protocol signaling message from each one of switch blades $104_1$ and $104_2$, and selects the switch blade with the highest-priority bridge root priority identifier as the root bridge.

Figure 2:
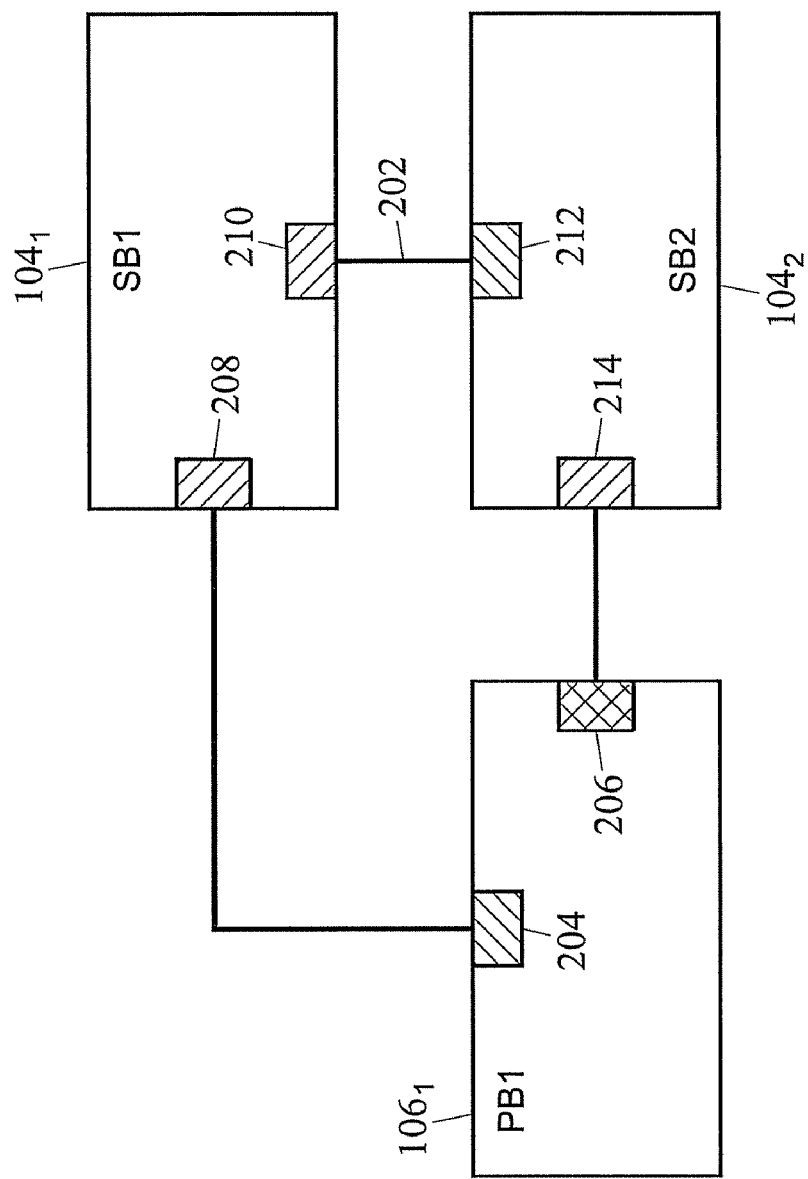
FIG. 2 is a block diagram of an exemplary logical spanning tree topology of a network node according to an embodiment of the subject matter described herein.

FIG. 2 is a block diagram of a virtual network topology representation that is generated by controller application 110 and is perceived by the receiving payload blade. The virtual network topology representation in FIG. 2 is a representation of an exemplary Ethernet network topology that includes switch blades $104_{1-2}$ and payload blade $106_1$. Only one payload blade is depicted in FIG. 2 for reasons of clarity. In this particular example shown in FIG. 2, switch blade $104_1$ has been designated as the preferred active switch blade by the results of priority adjustment algorithms $128_1$ and $128_2$. Moreover, switch blade $104_2$ has been designated as the preferred standby switch blade. As a result, STS 116 in each switch blade 104 may be configured to modify bridge root priority identifiers in standard STP signaling messages sent to each payload blade, e.g., payload blade $106_1$.

In one embodiment, four bridge root priority identifiers may be utilized, i.e. NEWLY_ACTIVE=1, ACTIVE=2, STANDBY=3, and NEWLY STANDBY=4. For example, the active switch blade may initially be assigned a bridge root priority identifier of NEWLY_ACTIVE=1, which is the bridge root priority identifier with the highest priority. Notably, it is numerically lower than the priority identifier for a standby switch blade (i.e., 3 or 4) or, if applicable, a currently active switch blade (i.e., 2) in case a switchover or failover procedure is to be conducted. For example, after initially being designated with a bridge root priority identifier of NEWLY_ACTIVE=1, the active switch blade may be subsequently assigned the bridge root priority identifier of ACTIVE=2 upon the expiration of a predefined period of time. This mechanism allows for immediate failover to be initiated upon receipt of a BPDU from a newly-active switch blade without having to receive an update BPDU from the switch blade that was previously active, and allows the possibility for a standby switch blade to assume the active switch blade status, if necessary.

Returning to FIG. 2, preferred active switch blade $104_1$ (using STS $116_1$) may modify the bridge root priority identifier in BPDU messages to advertise a value of 1 or 2, depending on the embodiment. Similarly, switch blade $104_2$ may modify the bridge root priority identifier to advertise a value of 3 or 4. STS 116 in each switch blade may also insert the virtual network topology representation into the modified BPDU. The virtual network topology representation includes a virtual link 202 (which does not physically exist) that connects switch blade $104_1$ and switch blade $104_2$ (e.g., between port 210 and port 212). The presence of the virtual link 202 in the virtual network topology representation indicates, to payload blades 106, that both switch blades have the same network connectivity. That is, both switch blades are connected to the same external networks, and thus, there is no advantage regarding the number of networks that may be accessed by selecting one switch blade over the other. Virtual link 202 further ensures that payload blade $106_1$ regards switch blade $104_1$ and switch blade $104_2$ as being communicatively connected. This perceived link connection enables payload blade $106_1$ to block port 206 to standby switch blade $104_2$. If virtual link 202 was not conveyed as such, payload blade $106_1$ would not block either port 204 or port 206 since payload blade $106_1$ would have to provide what it perceived to be a necessary active path between switch blade $104_1$ and switch blade $104_2$.

Returning to FIG. 2, payload blade $106_1$ may utilize its standard software application (SSA) $130_1$ to receive the BPDU messages from STS $116_1$ and STS $116_2$. SSA $130_1$ may also be used to generate a logical spanning tree using the bridge root priority identifiers and the virtual network topology representation in the received BPDU messages. In one embodiment, SSA $130_1$ constructs the logical spanning tree by comparing the bridge root priority identifiers of switch blade $104_1$, switch blade $104_2$, and payload blade $106_1$. Notably, bridge root priority identifiers are typically assigned to each payload blade in a manner that effectively prevents payload blades $106_{1-12}$ from becoming the "root" of the logical spanning tree. Specifically, payload blades $106_{1-12}$ are assigned a bridge identifier with an extremely low priority value (in comparison to the bridge identifiers of switch blades $104_{1-2}$). For example, each payload blade $106$ may be assigned a predefined low root priority (e.g., 0xFFFFFF00) thereby guaranteeing that a payload blade $106$ is never selected as a root bridge when logical spanning trees are generated with a standard STP. Since preferred active switch blade $104_1$ is associated with the bridge root identifier with the highest priority in this example, SSA $130_1$ selects switch blade $104_1$ as the root bridge for the logical spanning tree. As a result, the logical spanning tree generated by payload blade $106_1$ forces all application data traffic to the root bridge (i.e., the active switch blade). More specifically, the generated logical spanning tree causes payload blade $106_1$ to open a port connection $204$ (for application data communications) to the preferred active switch blade $104_1$ and block a port connection $206$ (for application data communications) to preferred standby switch blade $104_2$.

Figure 3:
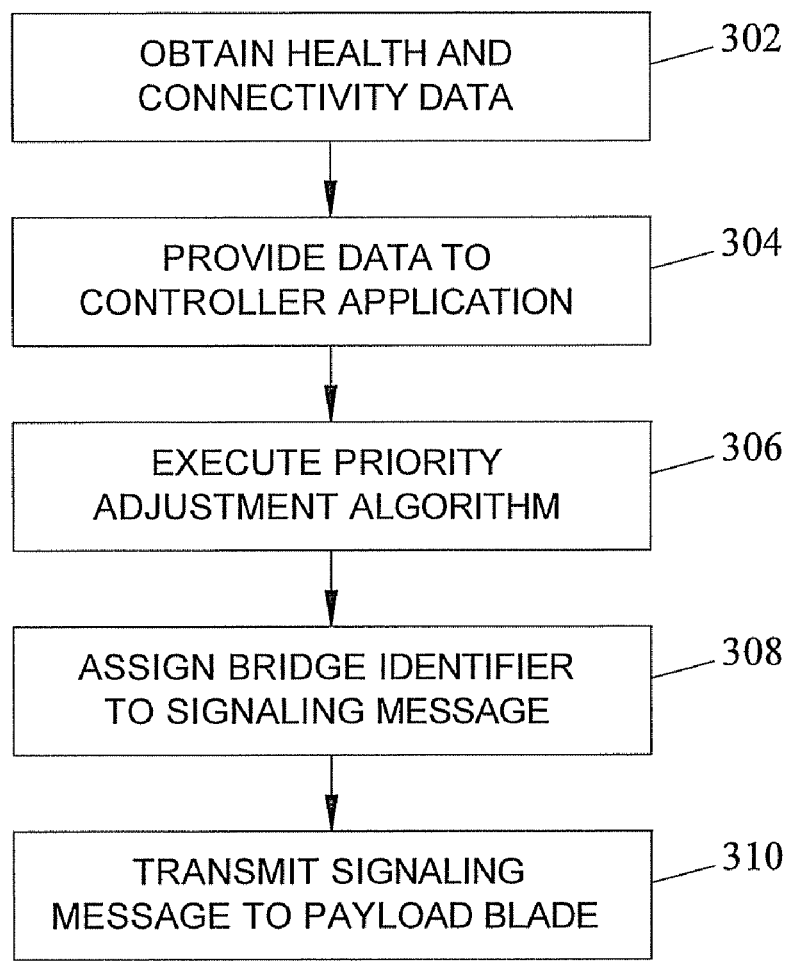
FIG. 3 is a flow chart of an exemplary process for utilizing a standard spanning tree protocol to indicate a preferred active switching fabric in a network node according to an embodiment of the subject matter described herein.

FIG. 3 is a flow chart that depicts the process of utilizing a standard spanning tree protocol to indicate an active switching fabric used by the elements in FIG. 1. Although FIG. 3 is directed to designating a single switch blade in network node $102$ as a preferred active switch blade, method $300$ may be used to designate a plurality of active switch blades (e.g., for an active-active configuration) without departing from the scope of the present subject matter.

In block $302$, health and connectivity data for each switch blade is obtained. In one embodiment, switch monitor process $108_1$ (executed by a CPU $118_1$) on switch blade $104_1$ monitors and acquires health and connectivity data pertaining to the switch blade's links and ports. Specifically, the health and connectivity data may include the number of all healthy internal links and the number of all healthy external ports associated with switch blade $104_1$. Similarly, SMP $108_2$ may monitor and obtain health and connectivity data for switch blade $104_2$.

In block $304$, health and connectivity data is shared between the controller applications on the switch blades. In one embodiment, SMP $108_1$ on switch blade $104_1$ uses a proprietary protocol to forward (or make accessible) the health and connectivity data to controller application $110_1$. SMP $108_1$ may also provide the health and connectivity data associated with switch blade $104_1$ to controller application $110_2$ on switch blade $104_2$. Similarly, switch blade $104_2$ may use SMP $108_2$ to share its own health and connectivity data with switch blade $104_1$ in an identical manner.

In block $306$, a priority adjustment algorithm is executed. In one embodiment, after obtaining all of the health and connectivity data associated with switch blades $104_{1-2}$, controller application $110_1$ then processes the health and connectivity data using priority adjustment algorithm $128_1$. For example, controller application $110_1$ on switch blade $104_1$ uses a priority adjustment algorithm $128$ to process the health and connectivity data of switch blades $104_{1-2}$ in network node $102$ to determine which switch blade has the best health and connectivity. The switch blade determined to possess the greater health and connectivity (per the priority adjustment algorithm $128$) is designated by controller application $110$ as being the preferred active switch blade. In one embodiment, controller application $110_2$ executes priority adjustment algorithm $128_2$ to determine which switch blades has the greater health and connectivity contemporaneously to controller application $110_1$.

In an alternate embodiment, controller application $110$ may be run from a centralized location, such as a single designated switch blade. Instead of having the controller application on each of switch blades $104_{1-2}$ execute a priority adjustment algorithm $128$, a single controller application $110$ on a predefined switch blade may be configured to run the priority adjustment algorithm and subsequently distribute the results to the remaining switch blade.

In block $308$, a bridge root priority identifier is assigned to a standard STP signaling message. In one embodiment, controller application $110_1$ in switch blade $104_1$ manipulates the root priority value (i.e., bridge root priority identifier) in the signaling messages to be transmitted to each of payload blades $106_{1-12}$. For example, controller application $110_1$ may adjust the bridge root priority identifier advertised by the switch blade in its BPDU messages based on the results of priority adjustment algorithm $128_1$. If priority adjustment algorithm $128_1$ determines that switch blade $104_1$ is the preferred active switch blade and switch blade $104_2$ is the preferred standby switch blade, then controller application $110_1$ is configured to adjust its bridge root priority identifier to be a greater priority than the bridge root priority identifier assigned by controller application $110_2$. By modifying the bridge root priority identifier in this manner, the present subject matter CaO accurately predict that the healthier switch fabric (e.g., the active switch blade) will be selected by each of the payload blades $106_{1-12}$ running a standard STP (e.g., RSTP). For example, after determining the preferred active and standby roles, active switch blade $104_1$ adjusts its BPDU messages to advertise a bridge root priority identifier that is higher in priority than the bridge root priority identifier advertised in the BPDU messages from standby switch blade $104_2$.

In block $310$, the standard spanning tree protocol signaling messages are transmitted to the payload blades. In one embodiment, switch blade $104_1$ and switch blade $104_2$ each transmits at least one RSTP BDPU to each of payload blades $106_{1-12}$. In one embodiment, the BPDU messages carry the bridge root priority identifier that is respectively associated with the sending switch blade. The BPDU signaling message also contains a virtual network topology representation derived by controller application $110$. The virtual network topology representation is a contrived topology that includes both switch blades $104_{1-2}$ and the payload blade receiving the BPDU message.

Figure 4:
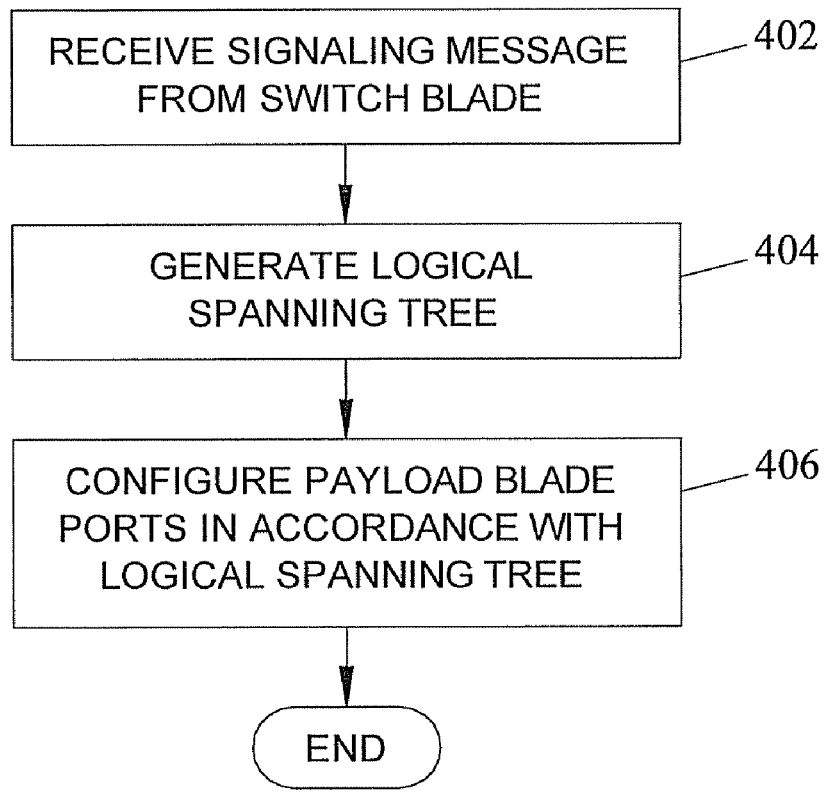
FIG. 4 is a flow chart of an exemplary process for utilizing a standard spanning tree protocol to provision a preferred

To better illustrate the process of utilizing a standard spanning tree protocol to provision an active switching fabric in a network node using the components depicted in FIG. 1, FIG. 4 is provided to depict an exemplary method according to an embodiment of the subject matter described herein.

In block $402$, standard spanning tree protocol signaling messages are received by the payload blades. In one embodiment, payload blade $106_1$ receives an RSTP BDPU signaling message from each of switch blade $104_1$ and switch blade $104_2$. In one embodiment, the BPDU messages carry the bridge root priority identifier that is respectively associated with the sending switch blade and a virtual network topology representation that includes both switch blades $104_{1-2}$ and the payload blade receiving the BPDU message.

In block 404, a logical spanning tree is generated. In one embodiment, after being presented with the bridge root priority identifiers from switch blade $104_1$ and switch blade $104_2$, each payload blade 106 constructs a logical spanning tree using the bridge root priority identifiers received from switch blades $104_1$ and $104_2$, the predefined bridge root priority identifier of the receiving payload blades, and the virtual network topology representation. Notably, the generated logical spanning tree selects the preferred active switch blade as the root bridge since that switch blade has the lowest bridge root priority identifier (i.e., signifying the greatest priority).

In block 406, the payload ports are configured. In one embodiment, payload blade $106_1$ manipulates its ports in accordance with the generated logical spanning tree. Namely, payload blade $106_1$ enables the ports that are connected to the switch blade that has been selected as the root bridge (i.e., preferred active switch blade $104_1$). Similarly, payload blade $106_1$ disables or blocks the ports that are connected to the switch blade that was not selected as the root bridge, i.e., the preferred standby switch blade (i.e., switch blade $104_2$). This port adjustment action physically designates switch blade $104_1$ as the active switch blade and switch blade $104_2$ as the standby switch blade. It should be noted that the disabled ports block the transfer of application data but still permit the transfer of BPDU signaling messages (so as to allow for receiving signaling messages that may indicated the need for a failover or switchover to another switch blade).

In general, once a switch blade 104 has been selected as the active switch blade, there is no change in state until either its health and connectivity worsens, or the health and connectivity of the standby switch blade improves to a point where the standby switch exhibits greater health and connectivity levels in comparison (as determined by the priority adjustment algorithm). Similarly, one of the switch blades may be designated as a preferred failback switch blade. This designation may be important when priority adjustment algorithm 128 determines that each switch blade $104_{1-2}$ has equal health and connectivity. In such a case, the configured failback switch blade is selected regardless of the current state. However, switch blades $104_{1-2}$ may utilize a standard STP to dynamically reconfigure the logical spanning tree generated by payload blades $106_{1-12}$ if the priority of one of the participating switch blades $104_{1-2}$ changes. For example, when the connection between the active switch blade and a payload blade is lost, the standby switch blade may assume the active role. If this occurs, the newly activated switch blade advertises a bridge root priority identifier (e.g., NEWLY_ACTIVE=1) of higher priority than what was advertised by the previously active switch blade (e.g., ACTIVE=2) in the transmitted BPDU messages. This enables each of payload blades $106_{1-12}$ to recalculate its own logical spanning tree immediately, without waiting for a BPDU (or timeout) from the previously active switch blade.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for utilizing a standard spanning tree protocol to designate an active switching device in a network node, the method comprising:

generating a virtual network topology representation that includes a payload processing device connected to each of a first switching device and a second switching device, which share a virtual link that indicates that the first and second switching devices provide the same network access in the virtual network topology representation;

transmitting, from each of the first and second switching devices to the payload processing device, a standard spanning tree protocol signaling message that contains the virtual network topology representation and a bridge root priority identifier, wherein the bridge root priority identifier has been derived using an algorithm that considers whether the transmitting switching device is a preferred active switching device or a preferred standby switching device; and receiving transmitted standard spanning tree protocol signaling messages and utilizing a standard spanning tree protocol at the payload processing device to Construct a logical spanning tree using the virtual network topology representation and to select the preferred active switching device as a root bridge of the logical spanning tree based on comparing bridge root priority identifiers as required by the standard spanning tree protocol, wherein the payload processing device only communicates application data via a link to the switching device designated as the root bridge.

2. The method of claim 1 wherein using the algorithm includes obtaining health and connectivity data associated with each one of the first switching device and the second switching device, and executing a priority adjustment algorithm using the health and connectivity data in order to designate either the first switching device or the second switching device as the preferred active switching device.

3. The method of claim 1 wherein the network node includes at least one of a session border controller (SBC), a security gateway, a media gateway, a gateway controller, and a call server network node.

4. The method of claim 1 wherein the health and connectivity data for each of the first and second switching devices includes the number of healthy internal links and the number of healthy external ports of each of the first and second switching devices.

5. The method of claim 1 wherein the preferred active switching device includes a switch blade characterized as possessing the greatest health and connectivity in accordance to the algorithm.

6. The method of claim 1 wherein the standard STP signaling message includes a Rapid STP (RSTP) bridge protocol data unit message.

7. The method of claim 1 wherein the first and second switching devices and the payload processing device are communicatively connected via a backplane of the network node.

8. The method of claim 1 further comprising, opening, in the payload processing device, a port for application data communications that is associated with the link to the switching device designated as the root bridge.

9. The method of claim 1 further comprising, disabling, in the payload processing device, a port for application data communications that is associated with the switching device that is not designated as the root bridge.

10. A non-transitory computer readable medium having stored thereon computer executable instructions that when executed by a processor of a computer control the computer to perform steps comprising:

generating a virtual network topology representation that includes a payload processing device connected to each of a first switching device and a second switching device, which share a virtual link that indicates that the first and second switching devices provide the same network access in the virtual network topology representation;

transmitting, from each of the first and second switching devices to the payload processing device, a standard spanning tree protocol signaling message that contains the virtual network topology representation and a bridge root priority identifier, wherein the bridge root priority identifier has been derived using an algorithm that considers whether the transmitting switching device is a preferred active switching device or a preferred standby switching device; and receiving transmitted standard spanning tree protocol signaling messages and utilizing a standard spanning tree protocol at the payload processing device to construct a logical spanning tree using the virtual network topology representation and to select the preferred active switching device as a root bridge of the logical spanning tree based on comparing bridge root priority identifiers as required by the standard spanning tree protocol, wherein the payload processing device only communicates application data via a link to the switching device designated as the root bridge.

11. The computer readable medium of claim 10 wherein using the algorithm includes obtaining health and connectivity data associated with each one of the first switching device and the second switching device, and executing a priority adjustment algorithm using the health and connectivity data in order to designate either the first switching device or the second switching device as the preferred active switching device.

12. The computer readable medium of claim 10 wherein the network node includes at least one of a session border controller (SBC), a security gateway, a media gateway, a gateway controller, and a call server network node.

13. The computer readable medium of claim 10 wherein the health and connectivity data for each of the first and second switching devices includes the number of healthy internal links and the number of healthy external ports of each of the first and second switching devices.

14. The computer readable medium of claim 10 wherein the preferred active switching device includes a switch blade characterized as possessing the greatest health and connectivity in accordance to the algorithm.

15. The computer readable medium of claim 10 wherein the standard STP signaling message includes a Rapid STP (RSTP) bridge protocol data unit message.

16. The computer readable medium of claim 10 wherein the first and second switching devices and the payload processing device are communicatively connected via a backplane of the network node.

17. The computer readable medium of claim 10 further comprising, opening, in the payload processing device, a port for application data communications that is associated with the link to the switching device designated as the root bridge.

18. The computer readable medium of claim 10 further comprising, disabling, in the payload processing device, a port for application data communications that is associated with the switching device that is not designated as the root bridge.

19. A network node that utilizes a standard spanning tree protocol (STP) to indicate an active switch blade, the network node comprising:

a first switching device and a second switching device sharing a virtual link that indicates that each of the first switching device and the second switching device provides the same network access in a virtual network topology representation, wherein each of the first switching device and the second switching device is configured to:

generate the virtual network topology representation that includes a payload processing device connected to each of the first switching device and the second switching device; and transmit a standard spanning tree protocol signaling message that contains the virtual network topology representation and a bridge root priority identifier that is derived using an algorithm that considers whether the first switching device or the second switching device is a preferred active switching device; and at least one payload processing device, that includes the payload processing device, configured to:

receive transmitted standard spanning tree protocol signaling messages;

utilize a standard spanning tree protocol to construct a logical spanning tree using the virtual network topology representation; and select the preferred active switching device as a root bridge of the logical spanning tree based on comparing bridge root priority identifiers as required by the standard spanning tree protocol, wherein the at least one payload processing device only communicates application data via a link to the switching device designated as the root bridge.

20. The network node of claim 19 wherein the bridge priority root identifier is determined by obtaining health and connectivity data associated with each one of the first switching device and the second switching device, and executing the algorithm using the health and connectivity data in order to designate either the first switching device or the second switching device as the preferred active switching device.

21. The network node of claim 19 wherein the health and connectivity data for each of the first and second switching devices includes the number of healthy internal links and the number of healthy external ports of each of the first and second switching devices.

22. The network node of claim 19 wherein the preferred active switching device includes a switch blade characterized as possessing the greatest health and connectivity in accordance to the algorithm.

23. The network node of claim 19 wherein the standard STP signaling message includes a Rapid STP (RSTP) bridge protocol data unit message.

24. The network node of claim 19 wherein the first and second switching devices and the at least one payload processing device are communicatively connected via a backplane of the network node.

25. The network node of claim 19 further comprising, opening, in the payload processing device, a port for application data communications that is associated with the link to the switching device designated as the root bridge.

26. The network node of claim 19 further comprising, disabling, in the payload processing device, a port for application data communications that is associated with the switching device that is not designated as the root bridge.

* * * * *